Oct. 14, 1969  J. H. ELLINGER  3,472,321
FAN
Filed Nov. 24, 1967  3 Sheets-Sheet 1

Inventor
JOHN HENRY ELLINGER
Cushman Darby Cushman
Attorneys

Oct. 14, 1969    J. H. ELLINGER    3,472,321
FAN
Filed Nov. 24, 1967    3 Sheets-Sheet 3

Inventor
JOHN HENRY ELLINGER

By
Cushman Darby & Cushman
Attorneys

United States Patent Office 3,472,321
Patented Oct. 14, 1969

3,472,321
FAN
John H. Ellinger, Mickleover, Derby, England, assignor to Rolls-Royce Limited, Derby, England, a British company
Filed Nov. 24, 1967, Ser. No. 685,488
Claims priority, application Great Britain, Dec. 5, 1966, 54,417/66; Oct. 27, 1967, 48,910/67
Int. Cl. B64c 11/32, 11/06; F02k 3/06
U.S. Cl. 170—160.48
17 Claims

ABSTRACT OF THE DISCLOSURE

A fan structures for high by-pass ratio gas turbine engines having inner mounting means carried by a shaft, a plurality of radially extending inner blade portions mounted on the inner mounting means, a blade ring coaxial with the shaft and connected to the tips of the inner blade portions and a plurality of radially extending outer blade portions carried by the blade ring. An elastic connection is provided between the blade ring and the tips of the inner blade portions for permitting the blade ring to be free to be deformed in a controlled manner and the outer blade portions may or may not be pivotal on their longitudinal axes. The outer blade portions may be mounted on the outer blade ring at angularly displaced positions around the periphery of the blade ring with respect to the inner blade portions.

---

This invention relates to a fan.

It has recently been generally realised that high by-pass ratio gas turbine engines offer an economical and convenient means of propulsion for aircraft which cruise subsonically, and to provide these high by-pass ratios it has been suggested to use a large fan which compresses air at least part of which by-passes the gas generator section of the engine.

However such engines are subject to a drag penalty should any failure occur in in the engine, since the large fan may require to be arrested and hence causes a significant amount of drag. A possible solution to this difficulty would be to feather the blades of the fan should any failure occur, thus minimising the drag. However with large fans the problem of providing a structure adapted to support variable pitch blades becomes extremely difficult.

Again, with such fans it may well be advantageous to vary the fan pitch for thrust reversal, or to cater for varying flight conditions.

The present invention provides a fan whose structure is adapted to enable feathering or other pitch variation to take place on at least part of the fan blades, and has particular but not exclusive application to a fan used in conjunction with a gas turbine engine.

According to the present invention a fan comprises a shaft, a plurality of substantially radially extending inner blade portions mounted from the shaft, a blade ring coaxial with the shaft and connected to the tips of the inner blade portions, and substantially radially extending outer blade portions mounted from the blade ring, each outer blade portion being mounted so that it can rotate about its longitudinal axis.

Preferably said blade ring is adapted to take all centrifugal loads due to said outer portions when the fan is rotating and to provide mountings for the roots of said outer blade portions.

Said outer portions may conveniently be angularly displaced around the periphery of said blade ring with respect to the inner portions so that the drive transmission for said outer portions may be buried in said inner portions and said ring.

Preferably said ring is attached to said inner portions elastically so that the ring is free to deform in a controlled manner when the fan rotates.

In one construction according to the invention said blade ring has a substantially H shaped cross section, the limbs of the H extending radially to form end flanges while the web carries journals for mounting said outer blade portions.

The invention will now be particularly described merely by way of example with reference to the accompanying drawings in which.

Figure 1:
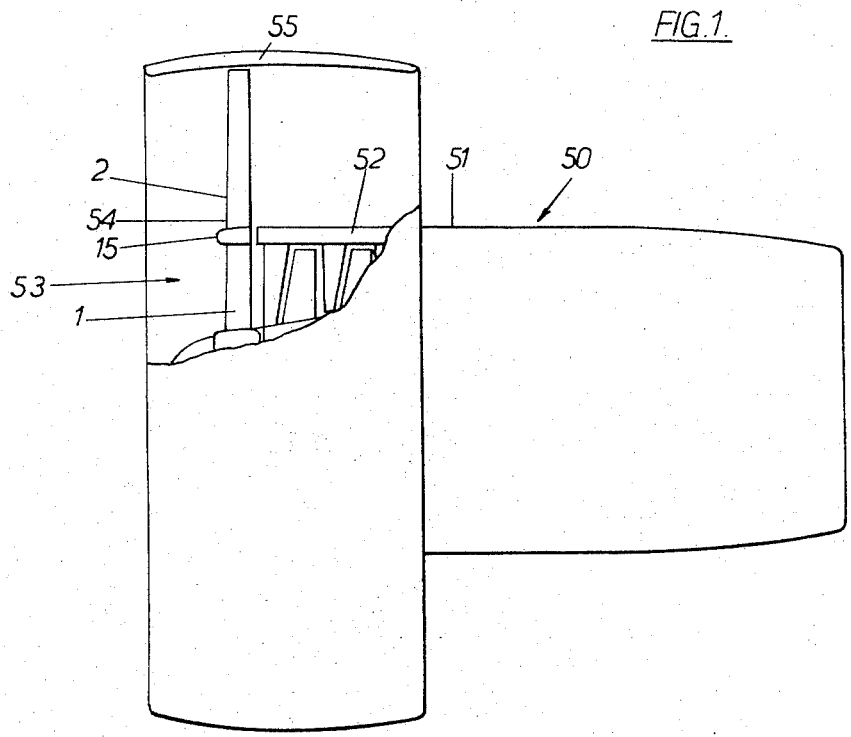
FIGURE 1 is a partly broken away sketch of a gas turbine engine including aerofoil section blades according to the invention.

In FIGURE 1 there is shown a gas turbine engine 50 having an outer casing 51 within which there are mounted a compressor 52, combustion equipment (not shown) a turbine (not shown) and a final nossle. The compressor and turbine are drivingly interconnected and as the first stage of the compressor there is mounted a fan 53. The fan comprises a plurality of blades 54 each which consists of an inner portion 1 and an outer portion 2. These portions are joined by a blade ring 15 which forms in effect the leading edge of the casing 51 of the main engine. The fan blades 54 are surrounded by a fan cowling 55.

Although the fan blades 54 have been referred to as being single blades, the outer portions are in fact displaced circumferentially from the inner portions so that they lie half-way between the inner portions 1.

It will be understood that should any component failure lead to the necessity to shut down or progressively arrest an engine such as 50 when the aircraft in which it is mounted is in flight the fan 54 will provide drag which varies with the geometry of the blade system in the by-pass duct. If such an occurence has to be allowed for it is normally necessary to uprate the engines to cover this contingency leading to increased cost and weight of the installed engine.

Again, it may be required to vary the pitch to provide thrust reversal or to adapt for varying conditions of flight.

In order to reduce the windmilling drag of the fan one could feather the blades of the fan. As in these fan blades there is usually a significant twist between the root and the tip it is undesirable to feather the entire blade since the drag increase of parts of the blade which are substantially parallel to the air flow will off-set drag decrease in those parts which are at a substantial angle. Therefore in the present case only the portion 2 is feathered, the portion 1 being maintained in its original relationship.

The mechanism for feathering these outer portions should ensure that the windmilling rotor comes to rest when the blades are fully feathered, causing a significant reduction in drag.

Figure 2:
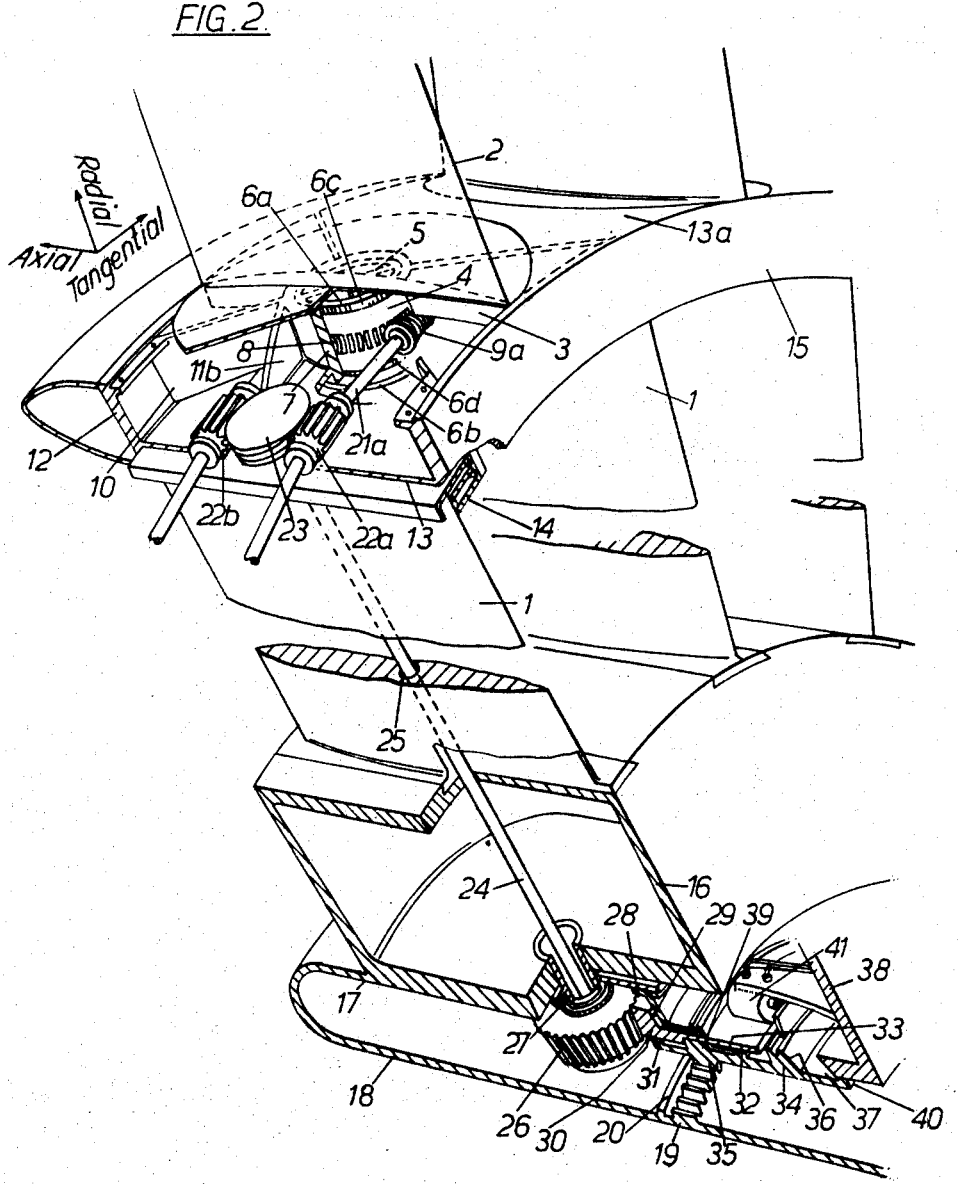
FIGURE 2 is a partly sectioned perspective view of the blades according to the invention.

FIGURE 2 illustrates the feathering mechanism and drive. The fan blade is divided into two parts by an outer blade ring 15, the inner blade portion 1 and the outer blade portion 2. As the pitch angle of portion 1 is normally small it is not desirable to feather this part of the blade. The relatively small root area at the blade mounting would in any case virtually preclude the installation of a suitable mechanism. The outer blade portion 2 is mounted at a significant pitch angle which increases diameter and consequently only this portion is feathered.

The inner blade portions 1 are mounted on an inner blade ring 16 which is driven at 17 from a shaft 18.

The outer blade portion 2 is subject to high centrifugal loading both along and about its longitudinal axis. The blade mounting of the portion 2 on to the ring 15 is designed to cater for these forces.

Blade portion 2 may be made in hollow metal or a suitable high strength plastic. In the latter case the plastic is partly embedded in a metallic mounting 3 which is part of the metallic journal 4 ribbed internally at 5 to minimise weight. Two axial bearings 6a, 6b and end nuts (not shown) and two radial bearings 6c and 6d transfer the forces and moments acting on the blades to the outer blade ring on corresponding surfaces on the inside of a cylindrical journal at 7. The blade root of each outer portion 2 is also provided with a toothed perimeter 8 which acts as a wheel mating with two worm gears (only one shown) 9a, 9b at a high reduction ratio.

Figure 3:
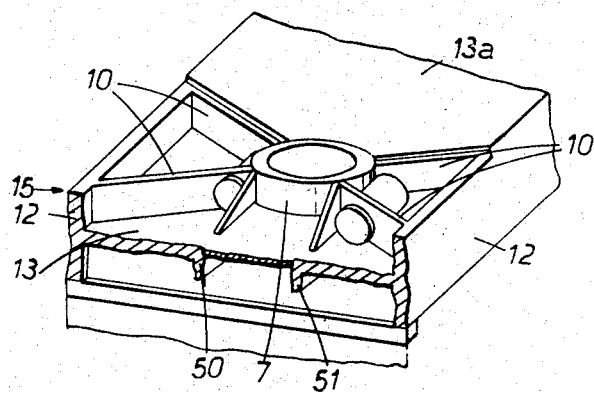
FIGURES 3, 4 and 5 are enlarged perspective views of critical areas of the construction according to the invention.

Details of the blade journal 7 and the arrangement for transferring forces to the ring 15 are shown in FIGURE 3.

The radial force acting on the bearings 6a and 6b is transferred in shear through four webs 10 to the end rims 12 of the H-section outer blade ring 15. These rims are designed to take most of the centrifugal forces acting on the blades, the blade mounting and the blade drive. The rims should be of minimum radial width to reduce aerodynamic drag. Their radial location coincides with the casing 51 which supports the static blades of the second and subsequent compressor stages.

The angle between the webs 10 equals the angle through which the blade portions 2 will rotate and the webs will provide suitable stops to limit the angle of rotation when high centrifugal twisting moments act on the blade portions under normal flight conditions.

The webs 10 also incorporate bearings for the worm gears 9a and 9b which are subject to high axial forces as well as normal gear separating forces.

The tangential torque transmitted through the blade portion is resisted by four webs, 11a, 11b, 11c, 11d (only one shown) interposed between bearing journal 7 and two internal peripheral flanges 50, 51 reinforcing the bore of the outer blade ring. These peripheral flanges transfer moments due to tangential torque on blade portions to a position midway between blade portions, at the point where the tips of the internal blade portions are fixed. As the moments cause equal and opposite radial forces at these points, only strength in shear must be provided and this is offered by the mid section of axial surface 13 (equal to the bearing width).

Axial loading on the outer blade portions due to the propulsive force provides a moment tending to twist the outer ring. This force is almost completely eliminated by a small forward inclination of the bearing 7, using the radial centrifugal force to provide a correcting moment. Thus torsion on the outer blade ring is small. Torsion is resisted by boxing in the outer ring to cover plates 13a, 13b. The H-section of the outer blade ring ensures that either the inner or the outer part of the blade ring offers some trosional resistance and thus minimises torsionally induced stresses in the end rims 12 of the blade ring. Thus the outer section of the blade ring provides the outer blade portion mounting and encloses the blade feathering mechanism.

The inner part of the outer blade ring secures the inner blade portions at their tips to the outer blade ring and covers the outer blade portion end nuts mentioned above.

The outer blade ring is highly stressed to lighten it as much as possible. Consequently it will suffer considerable radial deformation at full speed. The deformation of the inner blade ring 16 at the point of attachment 17 to the drive 18 should be small and equivalent to about one third of the stress in the outer blade ring. This will be very difficult to ensure if the inner blade portions 1 are rigidly attached to the outer blade ring 15. The method of feathering the outer blade portions also demands that the inner blade portions should be displaced by half a blade pitch relative to the outer blade portions. A rigid connection between the inner blade portions and the outer blade ring would cause the outer blade ring to become distorted (wave shaped) along the perimeter, causing high stresses both in the outer blade ring and along the inner blade portions. This would greatly impede the design of the outer blade ring and stress the inner blade portions excessively as they are subject to a high tangential bending moment as well as centrifugal loading due to their own weight. A simple device which relies on sliding contact between the inner blade portion tips and the outer blade ring would be subject to severe fretting.

The elastic element designed to minimise radial loading on the outer blade ring and the inner blade portions respectively should primarily have only one degree of freedom thus providing a rigid tangential drive between the inner blade portions and the outer blade ring. Sufficient torsional stiffness, will limit undue fore and aft oscillation of the outer blades whilst restraining all axial movement. The boxed-in spring flexure 14 (shown in FIGURE 4) satisfies this requirement especially as it will be torsionally weaker than the outer blade ring 15 and thus reduce torsionally induced stresses in the ring.

It will be seen that the tip of the inner blade portion 1 forms one side of an axially extending box section, the opposite side of which is rigidly attached to an axial flange 53 attached to the ring 15. The two remaining sides 54 and 55 are slightly flexible and allow controlled relative movement between the blade portions 1 and ring 15 in substantially only the radial direction. Thus since the two flexible sides cannot lengthen or shorten any relative movement must be in the direction of the other two sides, that is the radial direction.

It will be understood that although a single spring extending circumferentially and rigidly attached to both the inner blade portions tips and the outer blade ring would give the ring controlled freedom of radial motion, this arrangement would cause undesirable bending loads on the inner blade portion tips. With the illustrated arrangement the inner blade portion tips only move in a radial direction with respect to the outer blade ring.

Figure 4:
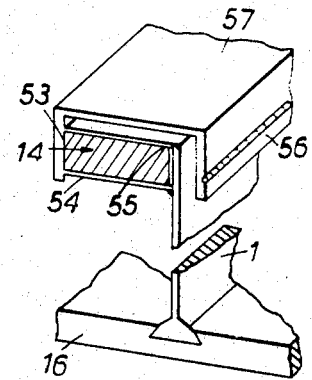

It will be noted from FIGURE 4 that the spring flexure 14 is mounted between a pair of axially extending flanges 53 and 56 from the inner surface of the H-section ring 15. These flanges are joined by a member 57 so as to form an axially extending channel section which provides some additional stiffening to the blade ring 15.

It is possible that there might be some danger of the spring leaves 54 and 55 buckling when they are subjected to stresses due to negative torque acting on the rotor. To preclude such a possibility the interior spaces between the leaves may be filled with a resilient material such as a synthetic rubber or the like.

The inner blades 1 and the inner blade ring 16 are preferably made in metal to ease manufacture and assembly although a plastic construction could eventually be used to lighten the structure. By fitting the outer blade portions 2 into the outer blade ring prior to fitting the inner blade portions to the outer blade ring, assembly of the inner blade ring 16 is facilitated; the inner blades are finally held in a dovetail and if necessary shrunk into position.

Figure 5:
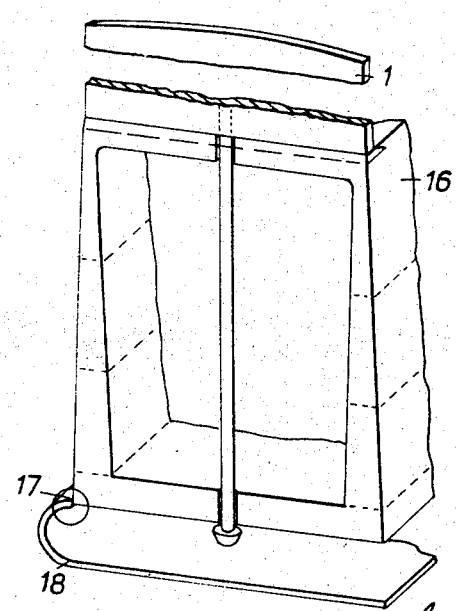

The inner blade ring 16, as shown in FIGURE 5, is designed to minimise the radial movement of spring flexures 14 to minimise their length on one hand and to minimise axial stress at the interface 17 where drive 18 is attached to inner blade ring 16.

The radially extending surfaces of the box section ring 16 are therefore tapered to offer an approximate root stress of ⅓ that in the outer blade ring and a circumferential stress ⅔ that in the outer blade ring. The inner blade ring is thus subject to critical stressing, and the junction 17 between drive 18 and ring 16 is not overstressed.

Drive 18 is stressed to take driving torque, aerodynamic loading, gyroscopic forces and radial expansion which can cause significant deformation. The peripheral spline 19 and bearing surface 20 are therefore not critically dimensioned.

The outer blade portion 2 is rotated via toothed wheel 8, worm gears 9a and 9b and shafts 21a and 21b (only one shown) which are connected flexibly to the wheels 22a and 22b. Both wheels are rotated in opposite sense by a central worm 23 whose drive rotates two blade portions on each side of the worm. Thus 24 outer blade portions would require 6 worm gears 23. A high reduction ratio between worms 9 and wheel 8 is essential to provide not only a self locking device but to reduce the diameter of shafts 21. This will ensure that a relatively low torque is transmitted through the small flexible couplings (not shown) between shafts 21 and wheels 22 and to make the system less sensitive to inevitable machining errors.

In view of the high reduction ratio between wheel 8 and worm 9 and a further reduction ratio between wheels 22 and 23 the long driving shaft 24 can be of small diameter and fit easily through a bore 25 in the inner blade portion 1. Intermediate bearings may support the drive which terminates in pinion 26. The pinion is mounted on an internal bearing 27 which is adjustably connected at 28 with bearing 29 of bevel wheel 50. The bevel wheel carries two internal bearing surfaces 31 and 32 and a long spline 33. This spline is engaged by slide 34 whose short internal spline 35 engages with splines 19 on the drive 18 or alternatively the slide engages conical surface 36 on the mating surface 37 of the static housing 38. In each case, the spline 39 on the periphery of slide 34 will engage the internal splines 33 of bevel wheel 30. The slide is centred on bearing 40 which is in continuous operation whilst the fan blades rotate. Slide 34 is moved axially by a series of hydraulic cylinders 41 fitted to the static mounting 38. Thus flexible pipe connections are avoided. It will be possible to use an electric actuator in place of the cylinder 41.

During normal flight of an aircraft powered by the engine 49, slide 34 drives bevel wheel 30 at the same speed as drive 18 by engagement between splines 19, 35, 39 and 33. Thus there is no relative movement of pinion 26 about its own axis and the entire mechanism except bearing 40 and worm gear 9 is at rest and unloaded. It will be appreciated that axial centrifugal loads acting on the outer blade portions will cause considerable frictional force on the bearing 6b. This force will substantially reduce centrifugal twisting moments acting on the outer blade and consequently transmitted to the worms 9. Thus wear and failure for extraneous reasons is most unlikely.

When the engine windmills and the rotor is to be arrested, hydraulic cylinders 41 are activated and the slide 34 is moved axially to engage on conical surfaces 36 and 37 respectively. As the slide is thus arrested bevel wheel 30 is arrested and pinion 26 will now rotate about its own axis actuating the drive and feathering the outer blades. The rotor will therefore be subject to progressively less aerodynamic force tending to windmill the fan. When the blades have turned to a position where the air load is equal on both sides of the blade the rotor comes to rest. If, due to inertia the blades are turned beyond the equilibrium position then the rotor will reverse its direction of rotation due to air loading on the reverse surfaces of the blades. Some slip is then anticipated between conical surfaces 36 and 37. Thus the gear train has its own "feed back" system and requires no attention by the operator or complex monitoring equipment. This drive will be seen to be an exceptionally light epicyclic system which has low mechanical efficiency. This will make it relatively insensitive to hunting, whilst avoiding high machining tolerances.

To restore the blades to their original setting after engine maintenance the rotor is turned in the reverse direction by an external drive whilst the conical surfaces 36 and 37 are lightly engaged so that there will be some slip on the interface when the blades have reached the fully feathered position.

It will be appreciated that if a modified slide 34 is rotated frictionally either faster or slower than drive 18 the drive will be able to feather in either direction in flight. This would be useful where the flight plan of an aircraft demanded an engine capable of efficient operation at differing thrust levels, or to provide reverse thrust for landing or braking. Again it may be possible to effect some noise reduction by utilising controlled variable pitch on the fan blades. This can probably be achieved, after intensive stiffening of the entire system, by hydraulic, electric or mechanical means used to drive a member which can be engaged with the wheel 30.

Again it could be possible to use a motor driving directly on to the shaft 24, although this would entail further complication.

I claim:

1. A fan comprising: a shaft; inner mounting means carried by said shaft; a plurality of substantially radially extending inner blade portions mounted on said inner mounting means; a blade ring coaxial with said shaft and connected to the tips of said inner blade portions, said blade ring being substantially H shaped in cross section and defined by spaced radially extending end flanges connected together by a web; a plurality of journals mounted on said web; and a plurality of substantially radial extending outer blade portions mounted on said journals, said H shaped blade ring assuming all centrifugal loads due to said outer blade portions when the fan is rotating.

2. A fan comprising: a shaft; inner mounting means carried by said shaft; a plurality of substantially radially extending inner blade portions mounted on said inner mounting means; a blade ring coaxial with said shaft and connected to the tips of the inner blade portions; outer mounting means carried by said blade ring; a plurality of substantially radially extending outer blade portions mounted on said outer mounting means at angularly displaced positions around the periphery of said blade ring with respect to said inner blade portions; and means for pivoting said outer blade portions on their longitudinal axes, said last mentioned means including a drive transmission which extends through said inner blade portions and said blade ring.

3. A fan comprising: a shaft; inner mounting means carried by said shaft; a plurality of substantially radially extending inner blade portions mounted on said inner mounting means; a blade ring coaxial with said shaft; elastic connection means between said blade ring and the tips of said inner blade portions for permitting said blade ring to be free to deform in a controlled manner when said fan rotates; outer mounting means carried by said blade ring; and substantially radially extending outer blade portions mounted on said outer mounting means.

4. A fan as claimed in claim 3 including means to pivot said outer blade portions on their longitudinal axes, said pivot means extending through said inner blade portions and said blade ring.

5. A fan as claimed in claim 3 and in which each said connection comprises a spring flexure which allows controlled radial movement only of the ring with respect to the inner blade portions.

6. A fan as claimed in claim 5 and in which each said spring flexure comprises a pair of peripherally extending spring members which extend, in a direction tangential to a circle coaxial with the shaft, from the tip of said inner blade portion and which are attached to said inner-blade portion at one extremity and to the blade ring at the other extremity.

7. A fan as claimed in claim 6 in which said blade ring is substantially H shaped in cross section and defined by spaced radially extending end flanges connected by a web.

8. A fan as claimed in claim 7 and in which each said spring flexure is attached to the web of said H section in between a pair of axail flanges which project from the inner surface of the web of said ring.

9. A fan as claimed in claim 8 and in which the space between said spring member is filled with a resilient material.

10. A fan as claimed in claim 1 and in which said H section is provided with stiffening skins which interconnect the radially inward and or radially outward peripheries of said end flanges.

11. A fan as claimed in calim 10 and in which said journals comprise cylindrical shells, said outer blade portions having roots formed to fit within said cylindrical shells for rotation therein about their longitudinal axis.

12. A fan as claimed in claim 11 and in which said blade ring comprises webs extending from each of said journals to the end flanges whereby forces and moments may be transferred to said end flanges.

13. A fan as claimed in claim 12 and in which there is a drive for rotation of the outer blade portions, said webs comprising supporting means for elements of said drive.

14. A fan as claimed in claim 13 and in which said ring is provided with peripherally extending stiffening flanges on the radially inner surface of its web.

15. A fan as claimed in claim 14 and in which there are connecting webs which extend from each said journal to the peripherally extending flanges.

16. A fan as claimed in claim 1 and in which said inner mounting means is a hollow box section annular member which is attached to said shaft, and from which each said inner blade portion is mounted.

17. A fan as claimed in claim 16 and in which said box section member has radially extending walls which taper in thickness from their inner extremity to their outer extremity so that stresses at their inner extremity are diminished whereby drive from said shaft may be introduced at said inner extremity without overstressing the box section member.

References Cited

UNITED STATES PATENTS

| | | | |
|---|---|---|---|
| 2,670,050 | 2/1954 | Enos | 170—167 X |
| 3,153,907 | 10/1964 | Griffith. | |

FOREIGN PATENTS

| | | |
|---|---|---|
| 332,943 | 2/1921 | Germany. |
| 378,149 | 1/1940 | Italy. |

EVERETTE A. POWELL, Jr., Primary Examiner

U.S. Cl. X.R.

170—166, 167, 168; 230—122